(12) United States Patent
Gutierrez et al.

(10) Patent No.: US 11,099,890 B2
(45) Date of Patent: Aug. 24, 2021

(54) DEVICES AND METHODS FOR PRIORITIZED RESOURCE ALLOCATION BASED ON COMMUNICATION CHANNEL CONDITIONS

(71) Applicant: Intel Corporation, Santa Clara, CA (US)

(72) Inventors: Ismael Gutierrez, San Jose, CA (US); Stefan Franz, Munich (DE); Ziyang Ju, Munich (DE); Rohit Bahl, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 187 days.

(21) Appl. No.: 15/376,768

(22) Filed: Dec. 13, 2016

(65) Prior Publication Data

US 2018/0165123 A1 Jun. 14, 2018

(51) Int. Cl.
*G06F 9/48* (2006.01)
*G06F 9/50* (2006.01)

(52) U.S. Cl.
CPC .......... *G06F 9/4881* (2013.01); *G06F 9/5005* (2013.01)

(58) Field of Classification Search
None
See application file for complete search history.

(56) References Cited

U.S. PATENT DOCUMENTS

| 7,032,222 | B1 | 4/2006 | Karp et al. | |
| 2006/0268762 | A1* | 11/2006 | Dominique | H04L 1/0021 370/328 |
| 2010/0115526 | A1* | 5/2010 | Mincarelli | G06F 9/5038 718/104 |
| 2010/0271972 | A1* | 10/2010 | Fujii | H04B 3/145 370/252 |
| 2013/0174172 | A1* | 7/2013 | Naga | G06F 9/4881 718/103 |
| 2013/0246208 | A1 | 9/2013 | Jain et al. | |
| 2013/0346994 | A1 | 12/2013 | Chen et al. | |
| 2014/0208327 | A1* | 7/2014 | Cadambi | G06F 9/5044 718/103 |

(Continued)

OTHER PUBLICATIONS

Nurmi et al. (Evaluation of a Workflow Scheduler Using Integrated Performance Modelling and Batch Queue Wait Time Prediction, 2006, IEEE, Proceedings of the 2006 ACM/IEEE SC|06 Conference, pp. 1-10) (Year: 2006).*

(Continued)

*Primary Examiner* — Lewis A Bullock, Jr.
*Assistant Examiner* — Melissa A Headly
(74) *Attorney, Agent, or Firm* — Viering, Jentschura & Partner MBB

(57) ABSTRACT

A device and a method for job scheduling at a signal processing component with limited queue availability, in response to a request for one or more new jobs, the method comprising: calculating a metric for each job in the queue and a request metric for the one or more new jobs, wherein each job's metric is based on a difference between an estimate output of executing the job in current conditions and a previous output of the job; determining a minimum metric from the metrics calculated for the jobs in the queue; and comparing the minimum metric to the request metrics to determine whether to schedule to new job for execution.

15 Claims, 8 Drawing Sheets

(56) References Cited

U.S. PATENT DOCUMENTS

2015/0199218 A1* 7/2015 Wilson .................. G06F 9/4881
718/104
2016/0275642 A1* 9/2016 Abeykoon ......... G06K 9/00711

OTHER PUBLICATIONS

International Search Report based on Application No. PCT/US2017/060739 dated Feb. 9, 2018, 16 pages.

* cited by examiner

DEVICES AND METHODS FOR PRIORITIZED RESOURCE ALLOCATION BASED ON COMMUNICATION CHANNEL CONDITIONS

TECHNICAL FIELD

Various aspects relate generally to methods and devices for resource allocation in a signal processor.

BACKGROUND

Hardware resource allocation plays a pivotal role in device performance. At certain times, a hardware resource may need to be shared between two (or more) synchronous or asynchronous real-time processes. However, the hardware resource's capacity may be insufficient to handle the number of requested jobs. As a result, jobs are discarded once the resource capacity (i.e. hardware queue) is full. These discarded jobs may be of critical importance to the device's performance. This disclosure provides an effective manner of hardware resource allocation to improve the probability that the most important jobs are executed.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which.

DESCRIPTION

Figure 1:
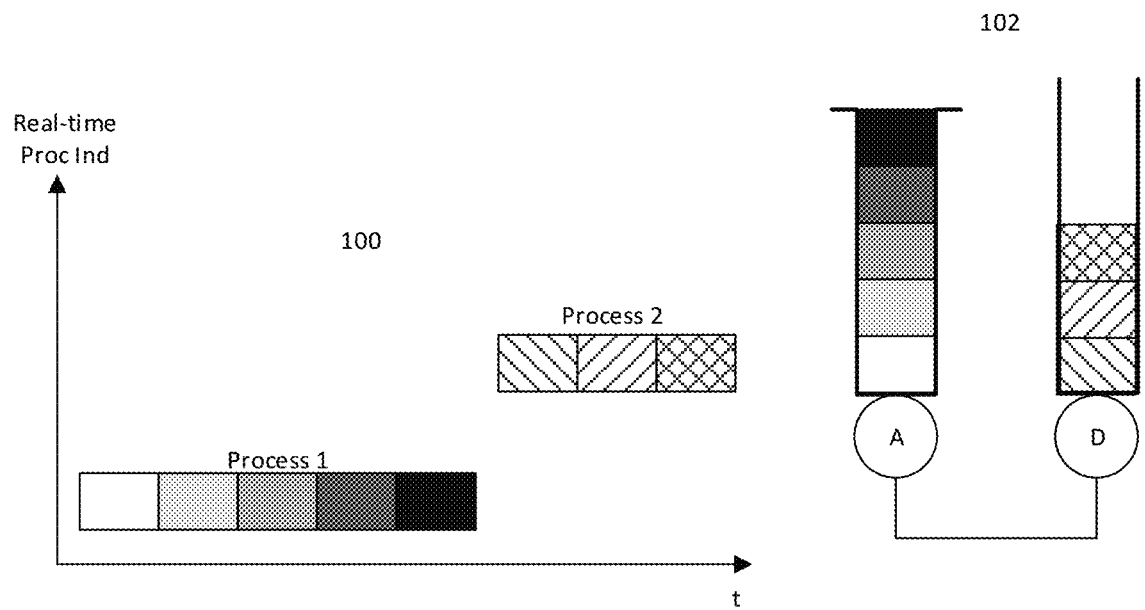
FIG. 1 shows a first-in first-out approach to hardware resource allocation.
Figure 1:
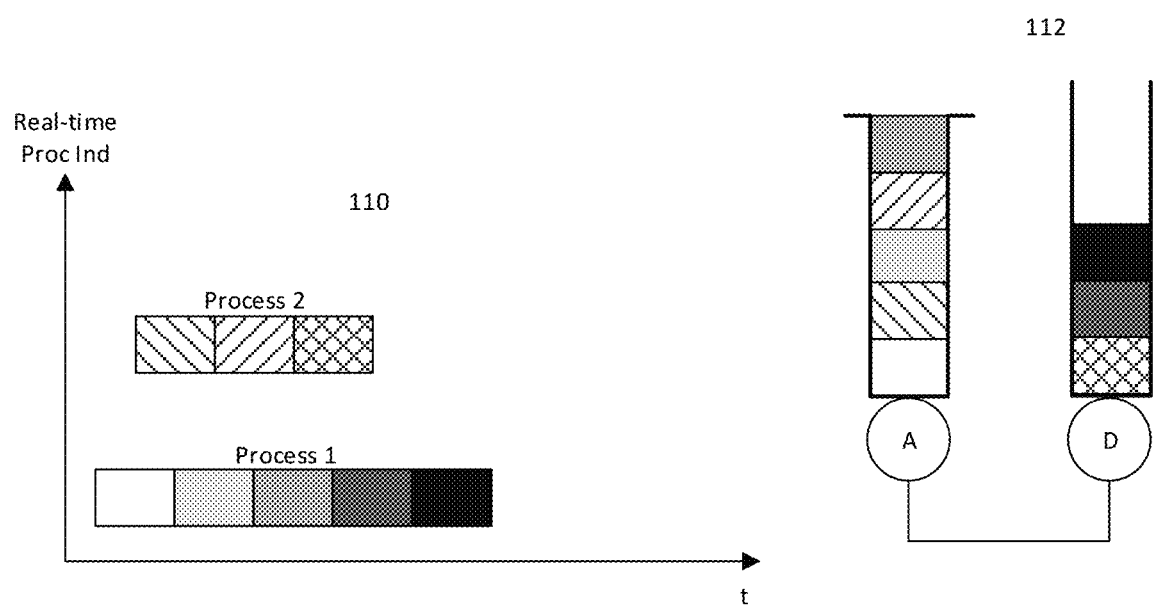

The following detailed description refers to the accompanying drawings that show, by way of illustration, specific details and aspects in which the invention may be implemented.

The word "exemplary" is used herein to mean "serving as an example, instance, or illustration". Any aspect or design described herein as "exemplary" is not necessarily to be construed as preferred or advantageous over other aspects or designs.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit. The term "circuit arrangement" may refer to a single circuit, a collection of circuits, and/or an electronic device composed of one or more circuits.

As used herein, "memory" may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The terms "user equipment", "UE", "mobile terminal" (i.e. MT), "mobile station", (i.e. MS), "user terminal", etc., may apply to any wireless communication device, including cellular phones, tablets, laptops, personal computers, wearables, multimedia playback and other handheld electronic devices, consumer/home/office/commercial appliances, vehicles, and any number of additional electronic devices capable of wireless communications.

The term "base station" used in reference to an access point of a mobile communication network may be understood as a macro base station, micro base station, Node B, evolved NodeB (eNB), Home eNodeB, Remote Radio Head (RRH), relay point, etc.

As used herein, a "cell", in the context of telecommunications, may be understood as a sector served by a base station. Accordingly, a cell may be a set of geographically co-located antennas that correspond to a particular sector of a base station. A base station may thus serve one or more "cells" (or "sectors"), where each cell is characterized by a distinct communication channel. An "inter-cell handover" may be understood as a handover from a first "cell" to a second "cell", where the first "cell" is different from the second "cell". "Inter-cell handovers" may be characterized as either "inter-base station handovers" or "intra-base station handovers". "Inter-base station handovers" may be understood as a handover from a first "cell" to a second "cell", where the first "cell" is provided at a first base station and the second "cell" is provided at a second, different, base station. "Intra-base station handovers" may be understood as a handover from a first "cell" to a second "cell", where the first "cell" is provided at the same base station as the second "cell". A "serving cell" may be understood as a "cell" that a mobile terminal is currently connected to according to the mobile communications protocols of the associated mobile communications network standard. Furthermore, the term "cell" may be utilized to refer to any of a macrocell, microcell, femtocell, picocell, etc.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access (WiMax) (e.g. according to an IEEE 802.16 radio communication standard, e.g. WiMax fixed or WiMax mobile) and other similar radio communication technologies. Cellular Wide Area radio communication technologies include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, encompasses both an access section of a network (e.g. a radio access network (RAN) section) and a core section of a network (e.g. a core network section). The term "radio idle mode" or "radio idle state" used herein in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the term "transmit" encompasses both direct (point-to-point) and indirect transmission (via one or more intermediary points). Similarly, the term "receive" encompasses both direct and indirect reception. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup tables and other array indexing or searching operations.

A job, within this disclosure, is defined as a task executed by a hardware unit and whose output is a function of certain input parameters. Two jobs with the same input parameters generate the same two outputs even if processed at two different instants. The number of jobs scheduled can exceed the hardware processing capacity, and jobs cannot be delayed or postponed. Additionally, once hardware starts processing a job, the job cannot be interrupted, i.e. it is non-pre-emptive.

Currently used solutions to hardware resource allocation include a first-in first-out (FIFO) approach (i.e. leaky bucket algorithm) and a rate control algorithm (i.e. token-bucket algorithm which assigns a certain rate to all process which share the hardware resource.)

In the FIFO approach, jobs are queued in the order that they are received by the hardware (HW) resource. Once the queue is full, further received jobs are dropped until there is sufficient space in the queue at the HW resource to accommodate any additional jobs. While the FIFO approach leads to a predictable maximum waiting time (which is good for real-time applications), it fails to guarantee fairness between the processes, resulting in some jobs being consistently dropped, i.e. starved. For example, for two asynchronous process, the jobs from one process may never be scheduled because at the time the jobs arrive at the HW resource, the HW queue is already full.

FIG. 1 depicts problems with the FIFO-based approach to HW allocation as identified in an aspect of this disclosure. The horizontal axis of 100 and 110 are the time (t) domain showing the point in time when the jobs are created, and the vertical axes of 100 and 110 are the Real-time processing index (Real-time proc ind) which indicates which process is generating reports. In these examples, the hardware processing queue length is limited to five jobs, but it is appreciated that the disclosure herein applies to different queue lengths (i.e. processing capabilities).

The top section (the pair of 100 and 102) of FIG. 1 depicts a first problem with the FIFO approach. Graph 100 shows an example in which two processes, Process 1 and Process 2, arrive at a HW resource at consecutive times. Process 1 has five jobs (depicted by the five boxes with varying levels of shading) and Process 2 has three jobs (depicted by the three boxes with different patterns). As shown by the Accepted (A) column in 102, only the five jobs associated with Process 1 may be accepted by the hardware resource, while the three jobs associated with Process 2 are all dropped (in the "D" column), i.e. rejected. In this scenario, jobs for Process 2 will never be scheduled because the queue (i.e. the A column) will always be full.

In a second scenario, the bottom section of FIG. 1 (110 and 112), the jobs of Process 1 and Process 2 arrive at the HW resource and are processed in an interleaved manner, i.e. in the manner in which each job arrives at the HW resource. Once the first five received jobs are accepted (in order: Process 1, Job 1; Process 2, Job 1; Process 1, Job 2; Process 2, Job 2; Process 1, Job 3), the remaining jobs are dropped. This may present problems if the jobs of higher importance are at the end of each of the processes. In this case, both processes may have their more important jobs dropped.

An alternative to the FIFO approach is a rate control algorithm approach which limits the number the maximum number of jobs a process can schedule (e.g. a token bucket algorithm) by assigning fixed rates to each of the processes. This approach would at least allow for a certain amount of jobs from all processes to be scheduled. However, as the rates for all the processes are fixed, performance of critical jobs of one process may never be scheduled because the assigned rate of the process is too small, while the assigned rate of other processes is not exhausted. In other words, this approach fails to account for jobs from different processes arriving at the HW resource asynchronously. Consequently, it is not possible to determine whether a job from one process should be dropped without information about jobs from other processes arriving at a different time.

The methods and devices disclosed in this disclosure determine which jobs are executed by the hardware based on hardware utilization statistics from each job in the past as well as information indicating likeliness that the result of the hardware run will be different from a previous run for the same job. With the proposed method, a utility metric is evaluated for each job, and from these utility metrics, scheduling decisions are made. The utility function takes into account all important parameters and combines them into a single utility metric to be compared across all jobs. The higher the utility metric, the higher the importance of the job and the higher the probability that the job will be scheduled. The amount of jobs scheduled depends on the available hardware processing capability at the time when the jobs are received, i.e. the length of the queue for the hardware resource.

One exemplary use case for the disclosure herein is the computation of channel state information (CSI) reports requested from the network to the user equipment (UE). The number of CSI reports that the network requests from the UE at a given instance can exceed the computational capacity of the UE. For example, in 3GPP Release 13, the number of triggered CSI reports for a given instant may be as large as 32. By implementing the disclosure herein, the UE hardware resources (i.e. silicon area) can be limited so that the resources do not need to scale with the number of jobs that are requested in a given time period. The UE will take a best effort approach when the job requests exceed the hardware capacity to process them.

A key principle in the disclosure herein is a job scheduling mechanism to share limited hardware resources based on a utility function (U(j)) which is computed on the basis of the expected difference in job output compared to past computations. Jobs providing a higher utility function are prioritized so that the probability that these jobs are executed by the hardware is increased. For jobs received when there are no hardware resources available and the utility function of the job is lower than that of already scheduled jobs, the job request is dropped and the job output from a previous computation is reused/copied (if available). By implementing the ensuing disclosure, system performance for a given set of hardware resources is improved by scheduling jobs with higher importance at any given instance, independent to when the job was received or to which process the jobs belong.

For the exemplary use case of CSI reporting, this leads to better throughput performance as the UE updates the performance of critical (i.e. higher utility metric) CSI reports, thus reflecting changed channel conditions, and feeds these reports back to the eNodeB (eNB).

The hardware resource scheduling among various synchronous or asynchronous processes is handled by utility-based tokens. For purposes of this disclosure, a token may be understood as a position in a queue waiting to be executed by the hardware resource. For each job that can be scheduled (i.e. position in the queue), there is one token. If a job is scheduled, it takes one from all available tokens (i.e. takes a position in the queue), thereby rendering that token as being "mapped." A "mapped" token may be stolen and given to another job in case the job is only scheduled but has not yet commenced execution.

Once the processing of a job is completed, the corresponding token is placed back in the "available" state. To "steal" a token refers to the process of remapping a token from one scheduled (mapped) job (Job1) to another job (Job2). After the token is stolen, Job1 is not scheduled anymore, i.e. it is discarded.

In sum, a token can have one of the following three states: (1) Available—token is free and is not connected to any job (i.e. a free position in queue at a resource); (2) Mapped—token is mapped to a job but execution of that job has not yet started, and therefore, may be eligible to be stolen by a subsequent job with a higher utility metric; and (3) Blocked—token is mapped to a job and execution of that job has started, and therefore, cannot be stolen.

Figure 2:
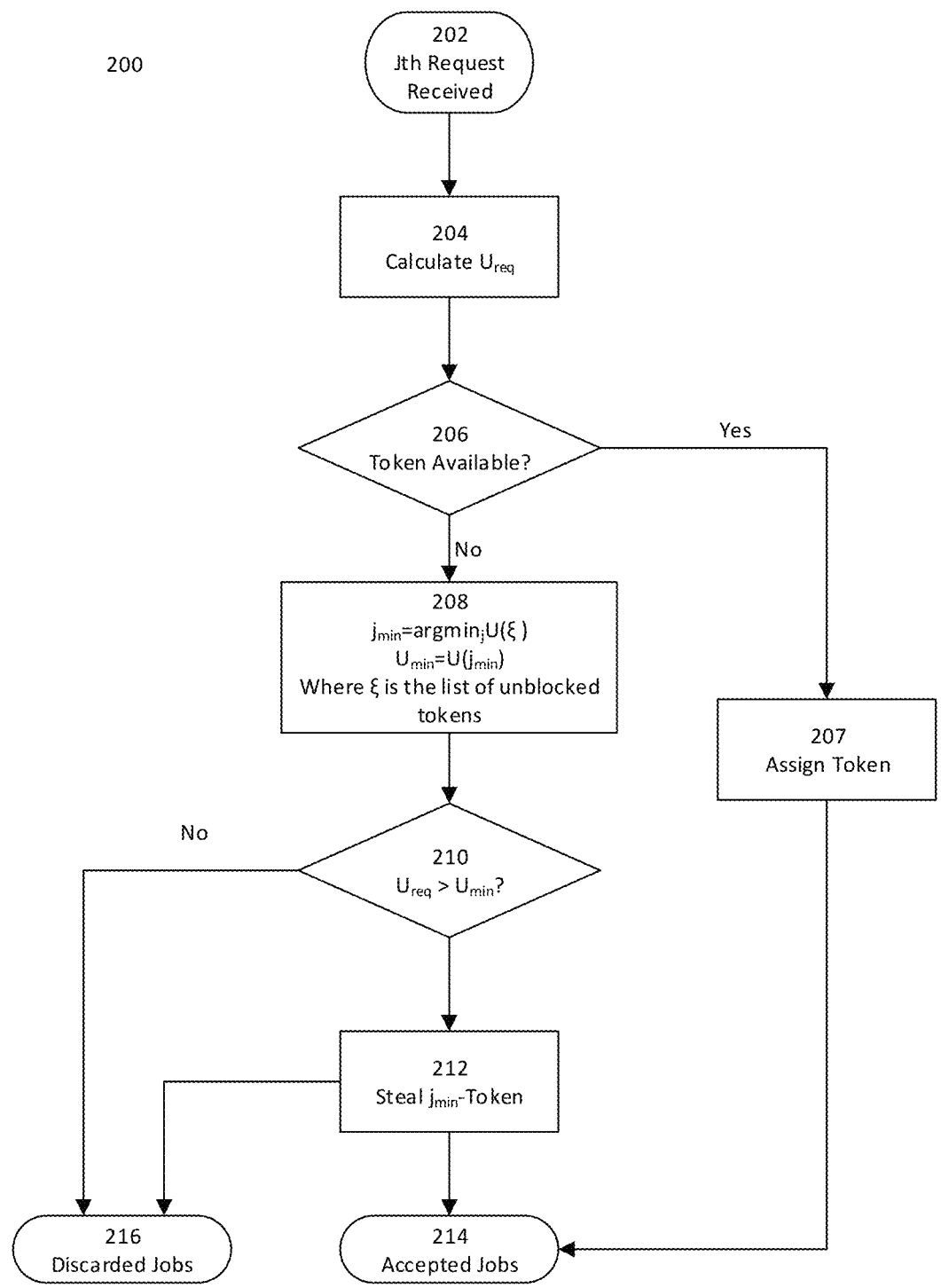
FIG. 2 shows a flowchart describing a method for hardware resource allocation in an aspect of this disclosure.

FIG. 2 is a flow diagram 200 showing a method of resource allocation in an aspect of this disclosure. It is appreciated that flow diagram 200 is exemplary in nature and may thus be simplified for purposes of this explanation.

Upon receiving a new job 202 (a job request), the utility metric for the job request is determined 204. The utility metric is determined by a utility function (U(j)), which is a monotonically increasing function whose output is higher the larger the difference between expected job output compared to a previous job output:

$$U(j) = E|\theta_j(t_1) - \theta_j(t_0)| \quad (1)$$

where $\theta_j(t_x)$ refers to the instantaneous metric for job j at time $t_x$. Time $t_0$ refers to the point in time when job j was last scheduled and time $t_1$ refers to the time corresponding to the current scheduling request of the job. E| ... | indicates the expected difference between the two job outputs, not the actual difference since the output of $\theta_j(t_1)$ is not yet available. The instantaneous metric $\theta_j(t_1)$ becomes available after the jth job for time $t_1$ has been processed. However, by using the parameters available at time $t_1$, the expected difference can be calculated in order to determine the utility metric for a given job.

For example, for the case of CSI reporting, Equation 1 can be expressed as a weighted average of several parameters which cause a change in the CSI reports as shown in Equation (2):

$$U(j) = \alpha_0 \cdot \frac{age_j}{age_{max}} + \alpha_1 \cdot \frac{corrChange_j}{corrChange_{max}} + \alpha_2 \cdot \frac{snrChange_j}{snrChange_{max}} + \alpha_3 \cdot \frac{dopplerChange_j}{dopplerChange_{max}} + \alpha_4 \cdot isPmiType_j + \alpha_5 \cdot isCriType_j \quad (2)$$

where $age_j$ is the age of job j, i.e. the difference in ms between the current subframe and the subframe the same trigger has updated, normalized to a maximum age $age_{max}$; $corrChange_j$ is the difference in channel correlation for job j since the last update of the job, normalized to a maximum corrChange$_{max}$; snrChange$_j$ is the difference in signal to noise ratio (SNR) for job j, normalized to a maximum snrChange$_{max}$; dopplerChange$_j$ is the difference in Doppler for job j since the last update the job, normalized to a maximum dopplerChange$_{max}$; isPmiType$_j$ is a binary indicator indicating whether a report contains a precoding matrix indicator (PMI); isCriType$_j$ is a channel state information reference signal (CRI-RS) indicator to be fed back to the network for job j; and the weighing factors, $\alpha_x$, determine the relative weight of the individual parameters, thereby reflecting the importance of each parameter.

Equation (2) is specific to a CSI use case. However, the first four parameters (i.e. the changes associated with the age, channel correlation, SNR, and Doppler) may be applied to all scenarios, with the final two parameters in Equation (2) (i.e. the PMI and CRI indicators) being specific to the CSI use case. The CRI parameter indicates to the base station which CSI-RS configuration (vertical beam) should be used for downlink, and it is used by the UE to estimate the channel and report channel quality information (CQI). The PMI parameter indicates to the base station which precoding matrix should be used for downlink transmission. Additional parameters, for example, those accounting for precoding type indicator (PTI) and/or rank indicator (RI) may be added as well.

The age$_j$ parameter (i.e. age of the job) is determined by the passage in time between the previous job and the current job, while the other parameters (e.g. differences in channel correlation, SNR, Doppler) may be determined, for example, from the CSI reports received at the previous job and the CSI reports received in the reference subframe when the new report request (i.e. job) is received.

Depending on the scenario, other parameters associated with weighing factors $\alpha_4$ and $\alpha_5$ may be substituted in for the PMI and CRI indicators. The weighing factors, $\alpha_x$, may be fixed or may also be dynamic variables that may be tuned as the system evolves.

Note that even though the first four parameters (i.e. the changes associated with the age, channel correlation, SNR, and Doppler) are expressed as a differences, these differences are not the difference of the output generated at the two difference times described in Equation (1). The difference operations in Equation (2) is a measure of the expected difference between the outputs generated at difference times, i.e. E|$\theta_j(t_1) - \theta_j(t_0)$|.

Once the utility metric for the requested job is calculated 204 ($U_{req}$), it is determined whether there is a token available to assign to the requested job 206. If there is an available token, i.e. there is a free position in the queue, the token is assigned to the requested job 207 and the job is accepted by the resource 214. If, however, there are no tokens available for the requested job, then the minimum utility metric ($U_{min}$) for jobs in the queue at the resource must be determined 208. The job associated with $U_{min}$ is denoted as $j_{min}$.

The minimum utility metric, $U_{min}$, is determined from all of the tokens which are not blocked 208, i.e. tokens assigned to jobs which have not yet begun being processed. Once the job with the lowest utility metric, $U_{min}$, from the queue is determined 208, it is compared to the utility metric for the requested job ($U_{req}$) 210.

If $U_{req}$ is less than or equal to $U_{min}$, then the requested job is discarded 216. If, however, $U_{req}$ is greater than $U_{min}$, then the requested job steals $j_{min}$'s token 212, and the requested job is accepted 214 and $j_{min}$ is discarded 216.

Furthermore, there may be a loop implemented in flowchart 200 as a precautionary backup from 210 to 208 (not pictured in flowchart 200). In this scenario, when making the comparison between $U_{req}$ and $U_{min}$, $j_{min}$ may have begun execution, and thus, its token would have entered into the blocked state. Accordingly, it would be impossible for the requested job to steal the token associated with j min. Therefore, instead of simply discarding the requested job, the lowest utility metric from the unblocked tokens would be determined and determined as the new $U_{min}$, and the job associated with the newly determined $U_{min}$ would be compared to $U_{req}$.

Figure 3:
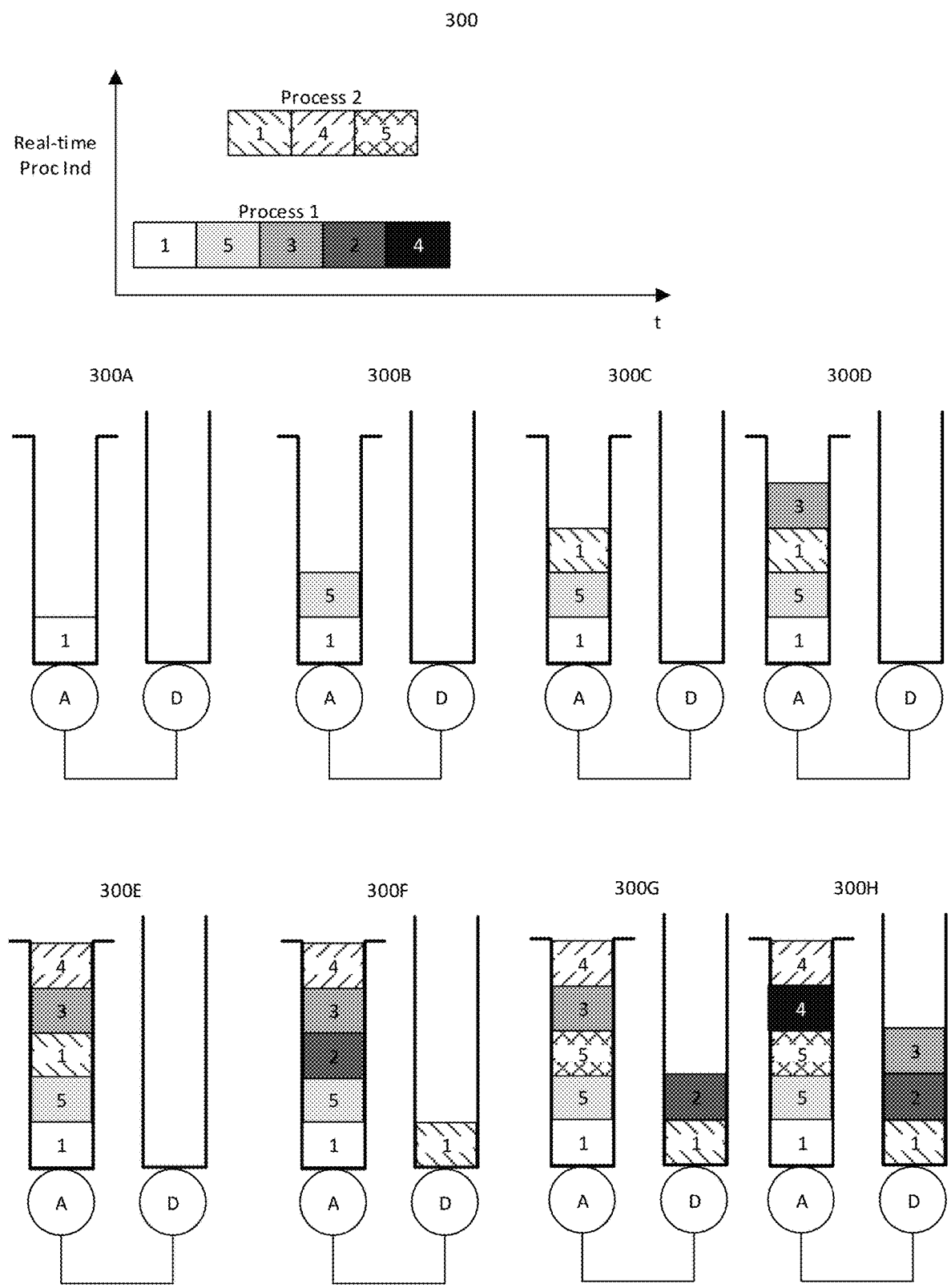
FIG. 3 shows a step-by-step approach to job scheduling in an aspect of this disclosure.

FIG. 3 shows a step-by-step job scheduling 300A-H for two asynchronous real-time processes at a resource in an aspect of this disclosure. It is appreciated that the step-by-step job scheduling 300A-H is exemplary in nature and may thus be simplified for purposes of this explanation.

Each of steps 300A-H correspond with chart 300, which depicts the arrival of two processes at a hardware resource. Process 1 is depicted as having jobs of varying shades and Process 2 is depicted as having jobs with different patterns. Each number in each job corresponds to the utility metric calculated for that job (e.g. by using Equations 1 and 2 for CSI reporting). Each of these utility metrics is calculated upon the respective job arriving at the hardware resource.

The "A" Column represents the accepted jobs and the "D" column represents the discarded jobs. As in previous cases within this disclosure, the ensuing explanation assumes a five job queue length for the hardware resource, but other queue lengths (i.e. capacities) are within the disclosure herein.

In this example, it is assumed that once the first job of Process 1 is scheduled, it is immediately executed, and therefore, its token cannot be stolen since it is in blocked state, while all other jobs in the A column are only scheduled, meaning that their token can be stolen (i.e. token in "mapped" state).

In the five steps, 300A-300E, the hardware resource accepts the first five received jobs (in order: Process 1, Job 1; Process 1, Job 2; Process 2, Job 1; Process 1, Job 3; Process 2, Job 2), regardless of utility metric, since all five positions in the queue (i.e. tokens) are available.

In 300F, there are no longer any "available" tokens (i.e. spots available in Column A) for the fourth Job of Process 1. However, instead of discarding the fourth job of Process 1 (with a utility metric of 2) in 300F, it's utility metric is compared to the utility metrics of the jobs in the queue in "mapped" states, i.e. the tokens are available to be stolen. Since the first job of Process 1 is in "blocked" state, this token cannot be stolen, even if the utility metric is lower.

After determining the minimum utility metric in the queue among tokens which can be stolen, i.e. Process 2, Job 1, the minimum utility metric is compared with the requested utility metric, i.e. the utility metric of the newly requested Process 1, Job 4. The requested utility metric (which is 2) is higher than the minimum utility metric (which is 1), so the requested job (i.e. Process 1, Job 4) replaces the job corresponding with the minimum utility metric (i.e. Process 2, Job 1) in the queue (i.e. Column A) and Process 2, Job 1 is discarded.

In 300G, a similar comparison for the next job, i.e. Process 2, Job 3, is performed. Process 2, Job 3 has a utility metric of 5, so it steals the token of the job associated with the minimum utility metric in the queue, which is Process 1, Job 4 with a utility metric of 2, and Process 1, Job 4 is discarded.

In 300H, the final job, i.e. Process 1, Job 5, shown in 300 is compared with the job having minimum utility metric in the A column, i.e. Process 1, Job 3 with a utility metric of 3.

Since the utility metric of Process 1, Job 5 is higher, it steals the token of Process 1, Job 3, i.e. it takes its position in the queue and discards Process 1, Job 3.

Note, if the utility metric for Process 1, Job 5 was 1 instead of 4, Process 1, Job 5 would have been discarded instead of discarding Process 1, Job 3 since Process 1, Job 5 would have had a lower utility metric than the minimum utility metric already in the queue.

In this manner, the jobs with the highest importance as determined by the utility function increase the likelihood of being processed and avoid being discarded. For the sake of simplicity, Process 1, Job 1 is shown as being executed throughout the duration of 300. However, it is appreciated that once Process 1, Job 1 has been executed, it opens up an additional available spot in the queue (i.e. makes available a token) for subsequent jobs.

In the above explanation for FIG. 3, it is understood that as jobs in the queue (in the A column) are executed, positions are opened (i.e. tokens are made available) in the queue for the next requested job. Accordingly, the next requested job after a job is executed and a position is opened can automatically be added to the queue without the need to compare its utility metric to that of the minimum since a position is open (i.e. a token is available).

While not explicitly shown in FIG. 3, the jobs may be sorted according to utility metric once the queue is full and newly requested jobs are received. For example, in 300F, the jobs (according to their utility metrics) in the "A" column may actually be sorted, from top to bottom: 1 (since this job is in execution, it's token is blocked); 5; 4, 3, and 2. A similar sorting may be performed in 300G and 300H in response to the jobs requested in those respective steps.

Figure 4:
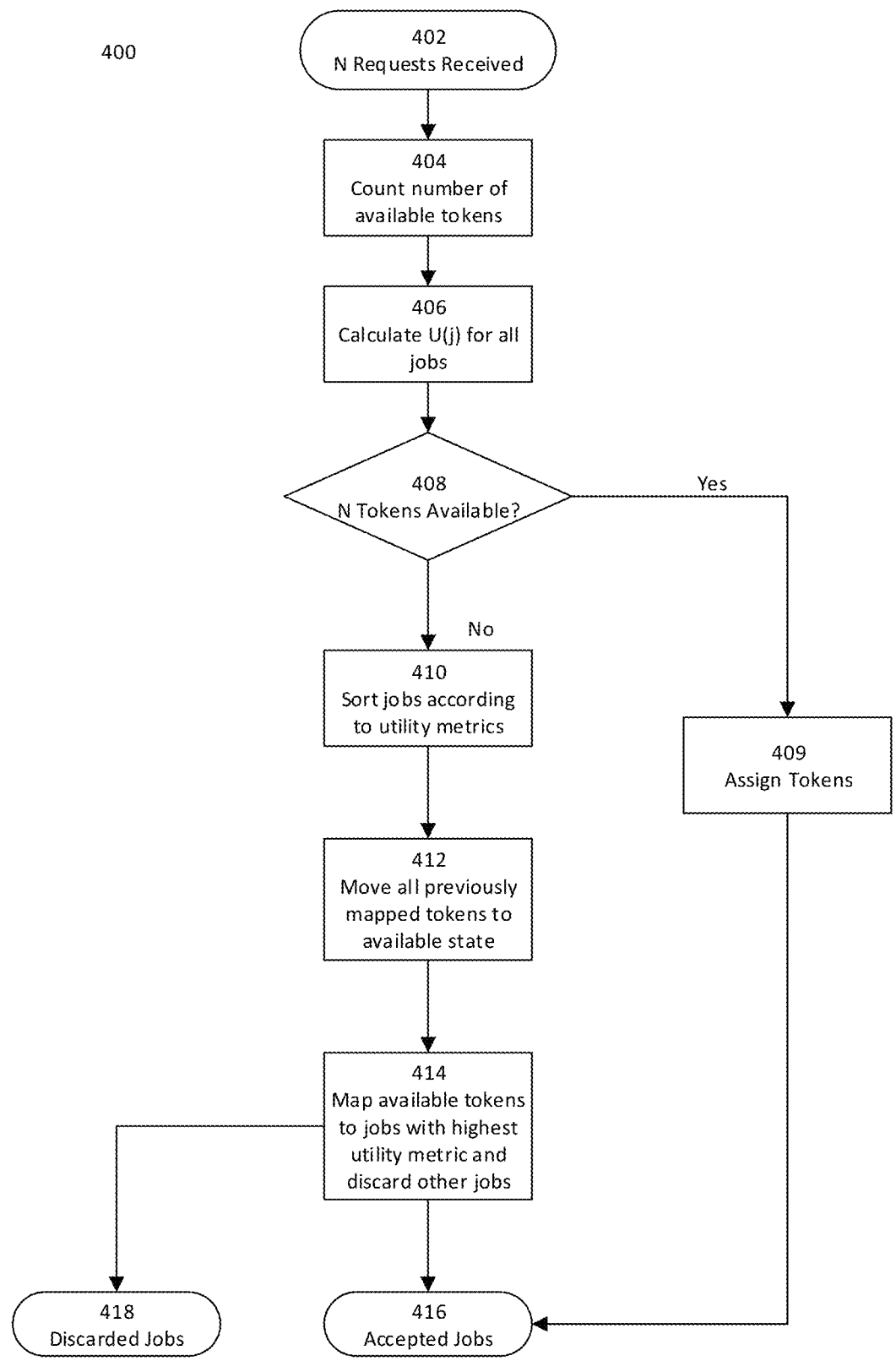
FIG. 4 shows a flowchart for scheduling multiple simultaneous jobs in an aspect of this disclosure.

FIG. 4 shows a flow diagram 400 depicting a process for scheduling multiple simultaneous jobs in an aspect of this disclosure. It is appreciated that flow diagram 400 is exemplary in nature any may thus be simplified for purposes of this explanation.

In flow diagram 400, N simultaneous requests are received at the hardware resource 402, where N is any integer greater than 1. After receiving the N requests 402, the number of available tokens are counted 404. Then, the utility metric U(j) is calculated for all jobs 406. This may include calculating the utility metrics for the newly requested jobs and the jobs in the queue which have not begun execution (i.e. "mapped" tokens). Alternatively, if the utility metrics for the mapped tokens have already been calculated, then only the utility metrics for the newly requested jobs need to be calculated in this step. In another aspect of this disclosure, the calculation of the utility metrics for the jobs may be performed prior to counting the number of available tokens. In other words, steps 404 and 406 may be switched.

After the utility metrics have been calculated and the number of available tokens have been counted, it is determined whether there are N tokens available 408. If there are, then the tokens are assigned to N requested jobs 409. For example, if three simultaneous job requests are received (N=3), it must be determined if there are three tokens available (i.e. three slots open in the queue). If it is determined that the appropriate number of tokens are available, then the three tokens are assigned to the three job requests. In another aspect, this step may be performed after the counting of number of available tokens 404 and prior to the calculation of the utility metric U(j) 406.

If there are fewer tokens available then the N requested jobs, the jobs are sorted according to their utility metrics 410. This sorting may include ranking the jobs according to utility metric in either ascending or descending order.

All previously mapped tokens are then moved to the available state 412. In another aspect of this disclosure, all previously mapped tokens may be moved to the available state after the determination that N tokens are not available is made, i.e. 412 may take place ahead of 408, and then the jobs may be sorted. In either case, once the tokens are available and the jobs have been sorted according to utility metric, the available tokens are mapped to the jobs with the highest utility metrics and the other jobs are discarded 414.

Figure 5:
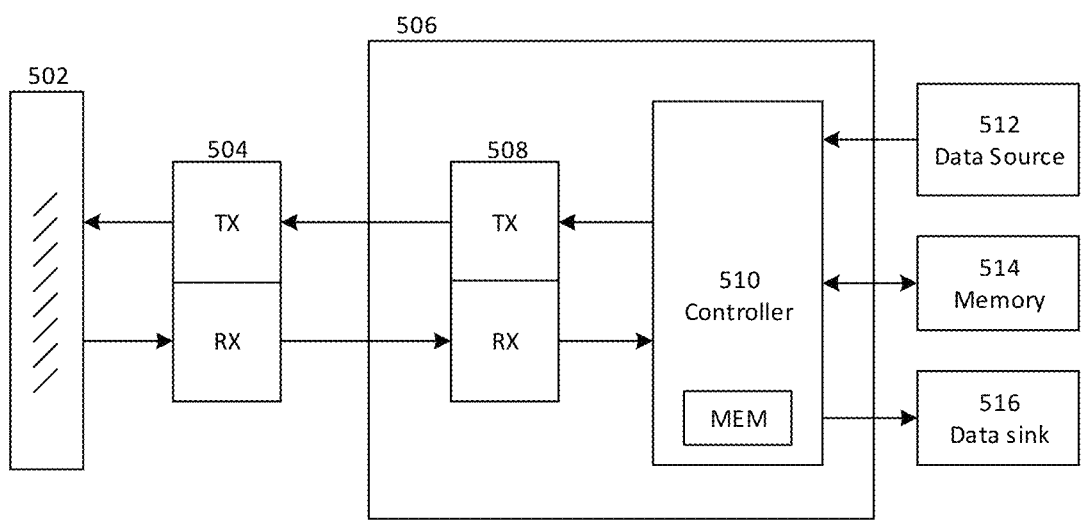
FIG. 5 shows an internal configuration of a device configured to allocate hardware resources in an aspect of this disclosure.

FIG. 5 shows an internal configuration of a device 500 which may be configured to perform hardware resource allocation procedures of this disclosure. For purposes of this explanation, the device 500 will be described in terms of being a user equipment (UE), but it is appreciated the hardware allocation procedures disclosed herein may implemented in other devices as well. The internal configuration of UE 500 is exemplary in nature and may thus be simplified for purposes of this explanation.

As shown in FIG. 5, UE 500 may include antenna system 502, radio frequency (RF) transceiver 504, baseband modem 506 (including physical layer processing circuit 508 and controller 510), data source 512, memory 514, and data sink 516. Although not explicitly shown in FIG. 5, UE 500 may include one or more additional hardware, software, and/or firmware components (such as processors/microprocessors, controllers/microcontrollers, other specialty or generic hardware/processors/circuits, etc.), peripheral device(s), memory, power supply, external device interface(s), subscriber identify module(s) (SIMs), user input/output devices (display(s), keypad(s), touchscreen(s), speaker(s), external button(s), camera(s), microphone(s), etc.), etc.

In an abridged operational overview, UE 500 may transmit and receive radio signals on one or more radio access networks. Baseband modem 506 may direct such communication functionality of UE 500 according to the communication protocols associated with each radio access network (RAN), and may execute control over antenna system 502 and RF transceiver 504 in order to transmit and receive radio signals according to the formatting and scheduling parameters defined by each communication protocol.

UE 500 may transmit and receive radio signals with antenna system 502, which may be a single antenna or an antenna array composed of multiple antennas and may additionally include analog antenna combination and/or beamforming circuitry. In the receive path (RX), RF transceiver 504 may receive analog radio frequency signals from antenna system 502 and perform analog and digital RF front-end processing on the analog radio frequency signals to produce digital baseband samples (e.g. In-Phase/Quadrature (IQ) samples) to provide to baseband modem 506. RF transceiver 504 may accordingly include analog and digital reception circuitry including amplifiers (e.g. a Low Noise Amplifier (LNA), filters, RF demodulators (e.g. an RF IQ demodulator)), and analog-to-digital converters (ADCs) to convert the received radio frequency signals to digital baseband samples. In the transmit path (TX), RF transceiver 504 may receive digital baseband samples from baseband modem 506 and perform analog and digital RF front-end processing on the digital baseband samples to produce analog radio frequency signals to provide to antenna system 502 for wireless transmission. RF transceiver 504 may thus include analog and digital transmission circuitry including amplifiers (e.g. a Power Amplifier (PA), filters, RF modulators (e.g. an RF IQ modulator), and digital-to-analog converters (DACs) to mix the digital baseband samples received from baseband modem 506 to produce the analog radio frequency signals for wireless transmission by antenna system 502. Baseband modem 506 may control the RF transmission and reception of RF transceiver 504, including specifying transmit and receive radio frequencies for operation of RF transceiver 504.

As shown in FIG. 5, baseband modem 506 may include physical layer processing circuit 508, which may perform physical layer (Layer 1) transmission and reception processing to prepare outgoing transmit data provided by controller 510 for transmission via RF transceiver 504 and prepare incoming received data provided by RF transceiver 504 for processing by controller 510. Physical layer processing circuit 508 may accordingly perform one or more of power control and weighting, error detection, forward error correction encoding/decoding, channel coding and interleaving, physical channel modulation/demodulation, physical channel mapping, radio measurement and search, frequency and time synchronization, antenna diversity processing, rate matching, retransmission processing, etc. Physical layer processing circuit 508 may be structurally realized as hardware logic, e.g. as an integrated circuit or FPGA, as software logic, e.g. as program code defining arithmetic, control, and I/O instructions stored in a non-transitory computer-readable storage medium and executed on a processor, or as a combination of hardware and software logic. Although not explicitly shown in FIG. 5, physical layer processing circuit 508 may include a control circuit such as a processor configured to control the various hardware and software processing components of physical layer processing circuit 508 in accordance with physical layer control logic defined by the communications protocol for the relevant radio access technologies. Furthermore, while physical layer processing circuit 508 is depicted as a single component in FIG. 5, physical layer processing circuit 508 may be collectively composed separate sections of physical layer processing circuitry where each respective section is dedicated to the physical layer processing of a particular radio access technology. The processing circuitry of physical layer processing circuit 508 may be configured to perform the methods disclosed herein.

UE 500 may be configured to operate according to one or more radio access technologies (RATs), which may be directed by controller 510. Controller 510 may thus be responsible for controlling the radio communication components of UE 500 (antenna system 502, RF transceiver 504, and physical layer processing circuit 508) in accordance with the communication protocols of each supported RAT, and accordingly may represent the Access Stratum and Non-Access Stratum (NAS) (also encompassing Layer 2 and Layer 3) of each supported RAT. Controller 510 may be structurally embodied as a protocol processor configured to execute protocol software (retrieved from controller memory MEM as shown in FIG. 5) and subsequently control the radio communication components of UE 500 in order to transmit and receive communication signals in accordance with the corresponding protocol control logic defined in the protocol software.

Controller 510 may therefore be configured to manage the radio communication functionality of UE 500 in order to communicate with the various radio and core network components of a network, and accordingly may be configured according to the communication protocols for the LTE network, the GSM/UMTS legacy network, or any other RAT network. Controller 510 may either be a unified controller that is collectively responsible for all supported RATs (e.g. LTE, GSM/UMTS, 5G, etc.) or may be composed of multiple separate controllers where each controller is a dedicated controller for a particular RAT, such as e.g. a dedicated LTE controller and a dedicated legacy controller (or alternatively a dedicated LTE controller, dedicated GSM controller, and a dedicated UMTS controller). Regardless, controller 510 may be responsible for directing radio communication activity of UE 500 according to the communication protocols of the LTE and legacy networks. As previously noted regarding physical layer processing circuit 508, one or both of antenna system 502 and RF transceiver 504 may similarly be partitioned into multiple dedicated components that each respectively correspond to one or more of the supported radio access technologies. Depending on the specifics of each such configuration and the number of supported radio access technologies, controller 510 may be configured to control the radio communication operations of UE 500 in accordance with a master/slave RAT hierarchical or multi-SIM scheme.

UE 500 may further comprise data source 512, memory 514, and data sink 516, where data source 512 may include sources of communication data above controller 510 (i.e. above the NAS/Layer 3) and data sink 516 may include destinations of communication data above controller 510 (i.e. above the NAS/Layer 3). Such may include, for example, an application processor of UE 500, which may be configured to execute various applications and/or programs of UE 500 at an application layer of UE 500, such as e.g. an Operating System (OS), a User Interface (UI) for supporting user interaction with UE 500, and/or various user applications. The application processor may interface with baseband modem 506 as an application layer to transmit and receive user data such as voice data, audio/video/image data, messaging data, application data, basic Internet/web access data, etc., over a the radio network connection(s) provided by baseband modem 506. Data source 512 and data sink 516 may additionally represent various user input/output devices of UE 500, such as display(s), keypad(s), touchscreen(s), speaker(s), external button(s), camera(s), microphone(s), etc., which may allow a user of UE 500 to control various communication functions of UE 500 associated with user data.

Memory 514 may embody a memory component of UE 500, such as e.g. a hard drive or another such permanent memory device. Although not explicitly depicted in FIG. 5, the various other components of UE 500 shown in FIG. 5 may additionally each include integrated permanent and non-permanent memory components, such as for storing software program code, buffering data, etc.

The baseband modem 506 may be configured to perform any of the processes and methods described herein, e.g. the processes described in other figures of this disclosure and their corresponding description.

Figure 6:
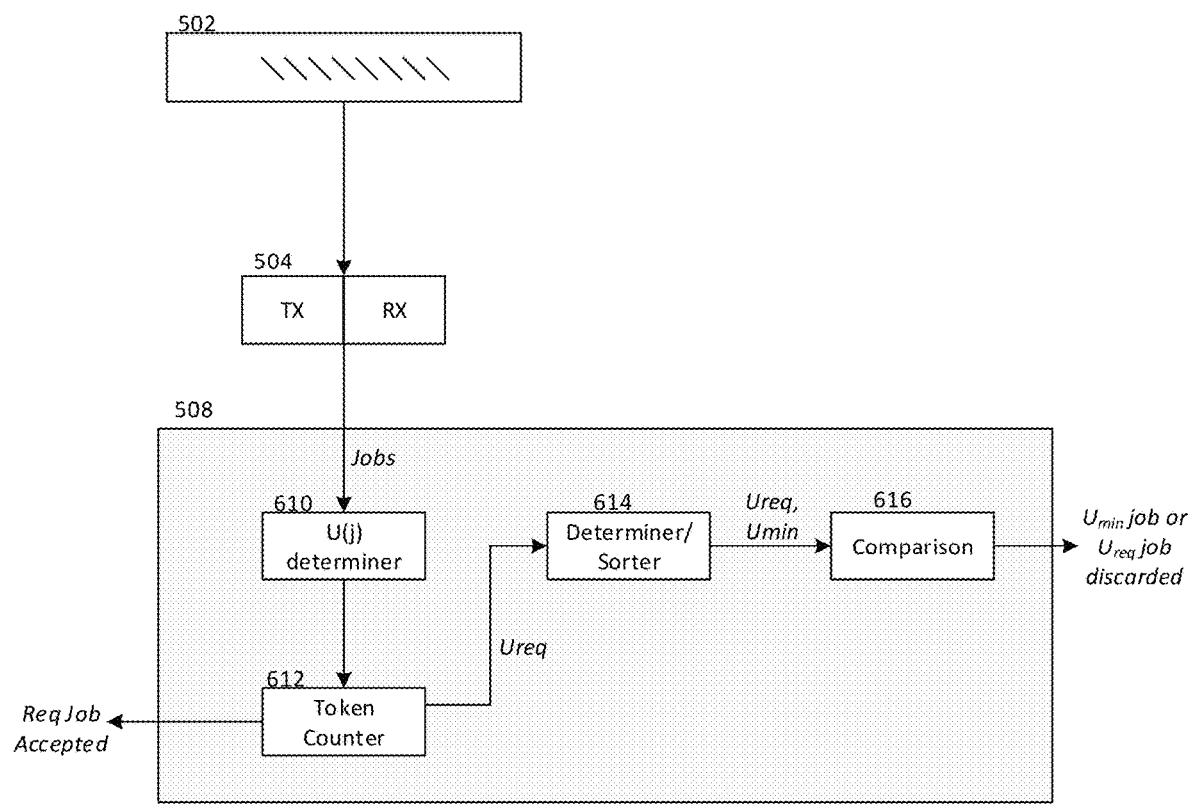
FIG. 6 shows a diagram detailing components of a device related to the hardware allocation procedures in an aspect of this disclosure.

FIG. 6 shows a diagram detailing components of a processing device 600 related to the resource allocation procedures of this disclosure. Accordingly, the illustrated depiction may omit certain components of device 600 that are not directly related to the resource allocation procedure.

As shown in FIG. 6, physical layer processing circuit 508 may include hardware allocation circuitry, including any combination of the following circuits: a utility metric ($U(j)$) determiner 610, a token counter 612, a determiner/sorter 614, and a comparison circuit 616. Each of the aforementioned components of hardware allocation circuitry may be structurally realized as hardware logic, e.g. as one or more integrated circuits or FPGAs, as software logic, e.g. as one or more processors executing program code that defining arithmetic, control, and I/O instructions stored in a non-transitory computer-readable storage medium, or as a combination of hardware and software logic. Skilled persons will appreciate the possibility to embody each component of hardware allocation circuitry in software and/or software according to the functionality detailed herein.

Hardware allocation circuitry may be a circuit arrangement including the appropriate combinations of any of the following circuits in order to implement the methods disclosed herein: a U(j) calculator 610 configured to determine a utility metric for all jobs; a token counter 612 configured to determine count the available tokens and determine if there are enough available tokens to assign to the requested jobs; a determiner/sorter circuit 614 configured to determine the minimum metric calculated for each of the plurality of the jobs in the queue and/or sort the jobs according to their utility metrics; and a comparison circuit 616 configured to compare the job with the minimum utility metric with the requested job's utility metric. The comparison circuit 616 may further be configured to accept the requested job if its utility metric is higher than the job with the minimum utility metric and discard the job associated with the minimum utility metric, or discard the requested job if the minimum utility metric is equal or higher.

In a further aspect of this disclosure, if the job associated with the minimum utility metric has entered into the blocked state, the comparison circuit 614 may be configured to compare the next lowest utility metric with the requested utility metric, i.e. assign the next lowest utility metric the role of $U_{min}$.

Figure 7:
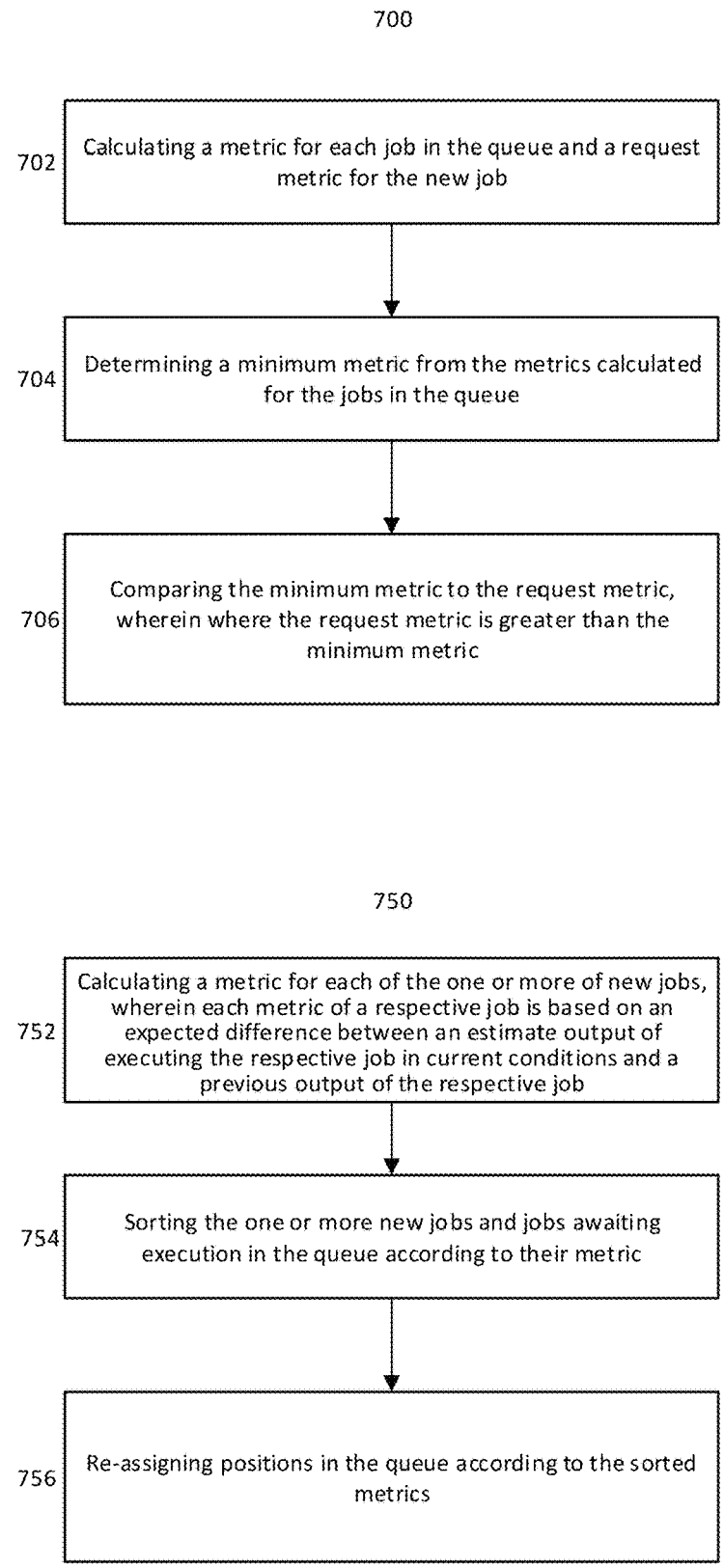
FIG. 7 shows flowcharts describing methods of this disclosure.

FIG. 7 is shows two flowcharts 700 and 750 describing methods for resource allocation in an aspect of this disclosure. It is appreciated that flowcharts 700 and 750 are exemplary in nature and may thus be simplified for purposes of this explanation.

The method described in flowchart 700 demonstrates a process implemented by a device component (e.g. a physical layer processing circuit component of a UE) in response to receiving a request for executing a new job (e.g. a CSI report request) when there are no available positions in a queue for jobs pending execution at the device component.

Metrics are calculated for each job in the queue and a request metric for the new job 702. Each job's metric is based on an expected difference between an estimate output of executing the job in current conditions and a previous output of the job. Furthermore, if there are a plurality of new job requests, a metric for each of the corresponding job requests may be calculated in an aspect of this disclosure. Additionally, metrics for the jobs in queue may be calculated only for those jobs which have not begun execution at the hardware component.

After the necessary metrics have been calculated, the minimum metric for the jobs in the queue is determined 704. This minimum metric may be determined only from those jobs who have tokens in the mapped state, and are thus available to be stolen by a requested job with a higher utility metric. The minimum metric is then compared to the request metric 706. If the request metric is greater than the minimum metric, the job associated with the minimum metric is discarded and a position in the queue is reallocated to the new job. If the minimum metric is greater than or equal to the request metric, the new job is discarded.

The method described in flowchart 750 shows the resource allocation process in an aspect of this disclosure when multiple job requests are simultaneously received at the device component. Upon receiving the multiple job requests, the utility metric for each of the new jobs is calculated 752. The utility metric is based on an expected difference between an estimate output of executing the job in current conditions and a previous output of the job. The utility metrics associated with the jobs in the queue may have already been determined at a prior stage. In an alternate aspect, the utility metric for the jobs in the queue may also calculated (or re-calculated) at this stage.

Once there is a utility metric for each of the jobs in the queue and the newly requested jobs, all of the jobs (jobs in the queue and the newly requested jobs) are sorted according to their corresponding metric 754. The jobs in the queue may consist of only those jobs which are in the mapped state. In this manner, jobs in the blocked state are excluded, since their tokens may not be stolen by a requested job. The sorting of the jobs may be done, for example, in ascending or descending order, according to the value of each job's utility metric.

Positions in the queue (i.e. tokens) are then assigned to the sorted jobs in order of their corresponding metric. In other words, jobs with the highest utility metric will receive a token prior to jobs with lower utility metrics. Accordingly, those jobs with higher utility metrics will be assigned positions in the queue until the queue is filled up, at which point any remaining jobs will be discarded. This method ensures that those jobs with higher utility metrics have a greater chance of being accepted rather than discarded.

Figure 8:
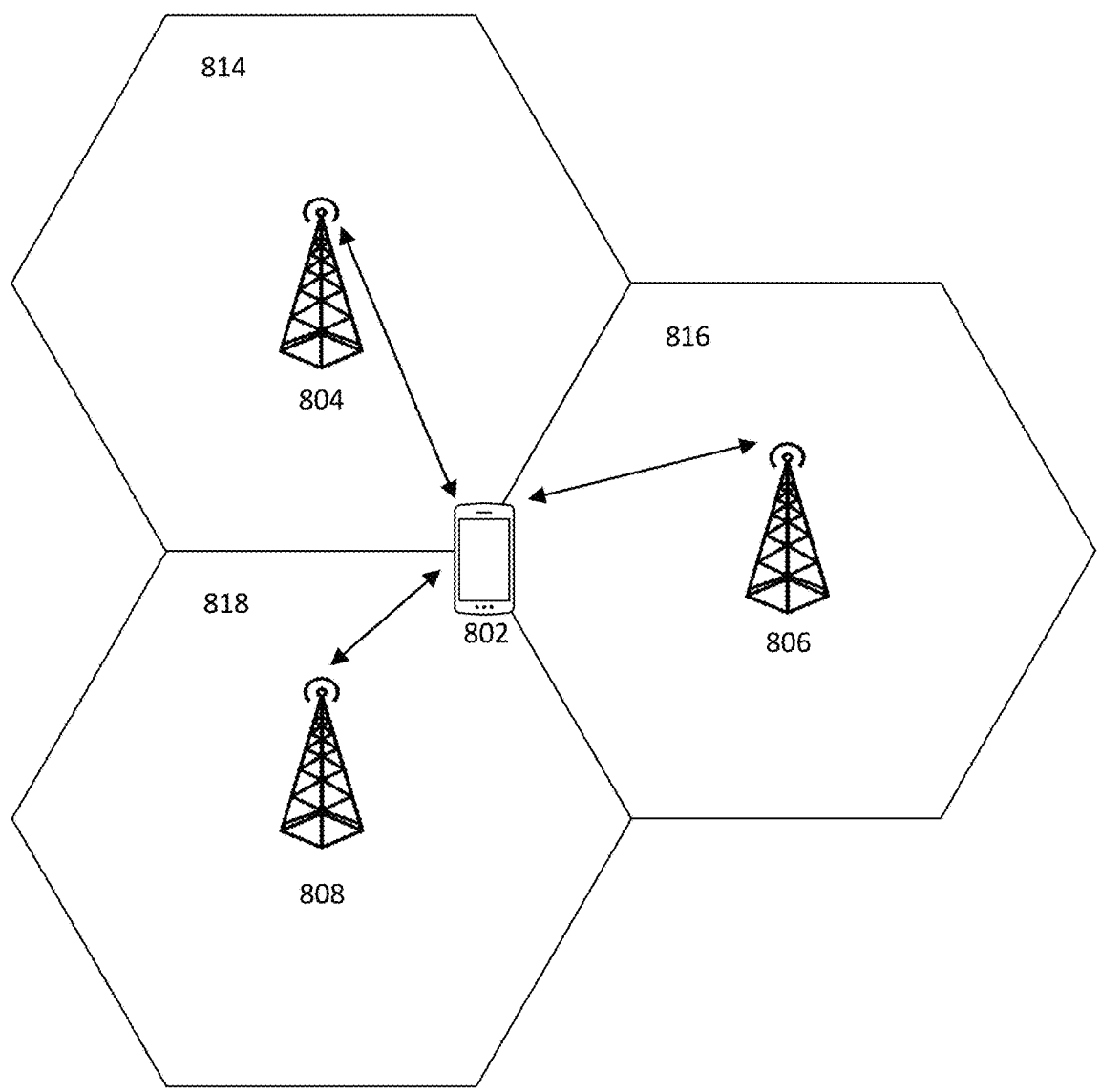
FIG. 8 shows a radio communication network in an aspect of this disclosure.

FIG. 8 shows a radio communication network 800 in an aspect of this disclosure. Radio communication network 800 may contain UE 802 and base stations 804-808. Each of base stations 804-808 may be an LTE base station (eNodeB or eNB) any may serve corresponding cells 814-818, respectively. Cells 814-818 may be sectorized, i.e. may consists of a plurality of cells. While cells 814-818 are shown as having distinct boundaries, it is appreciated that the cell coverage may overlap.

UE 802 may be connected with any of cells 814-818 via base station 804-808, respectively, and may thus transmit and receive data with any of cells 814-818 over corresponding communication channels. These receptions may include, for example, network requests to the UE 802 for CSI reports and the transmissions may include the UE 802 transmitting said CSI reports back to the network. Accordingly, UE 802 may be configured in the manner described in this disclosure in order to effectively manage its hardware resources. For example, UE 802 may be configured to perform the calculation of CSI reports to forward to any one or base stations 804-808 according to the methods described herein.

In Example 1, a method for job scheduling at a signal processing component having a full queue of jobs pending execution, in response to a request for a new job, the method including: calculating a metric for each job in the queue and a request metric for the new job, wherein each respective job's metric is based on a difference between an estimate output of executing the respective job in current conditions and a previous output of the respective job; determining a minimum metric from the metrics calculated for the jobs in the queue; and comparing the minimum metric to the request metric In Example 2, the subject matter of Example 1 may include wherein where the request metric is greater than the minimum metric, discarding the job associated with the minimum metric and reallocating a position in the queue to the new job.

In Example 3, the subject matter of Examples 1-2 may include wherein the minimum metric is greater than or equal to the request metric, discarding the new job.

In Example 4, the subject matter of Examples 1-3 may include determining the minimum metric from jobs in the queue which have not commenced execution.

In Example 5, the subject matter of Examples 1-4 may include evaluating whether execution of the job associated with the minimum metric has commenced prior to reallocating the position in the queue to the job with the greater request metric.

In Example 6, the subject matter of Example 5 may include wherein where execution of the job associated with the minimum metric has commenced, determining a next minimum metric from the calculated metrics for the remaining jobs in the queue and comparing the next minimum metric to at least one of the request metrics.

In Example 7, the subject matter of Example 6 may include wherein where the request metric is greater than the next minimum metric, reallocating a position in the queue to the job associated with the request metric and discarding the job associated with the next minimum metric.

In Example 8, the subject matter of Example 7 may include where the next minimum metric is greater than or equal to the request metric, discarding the job associated with the request metric.

In Example 9, the subject matter of Examples 1-8 may include wherein the reallocated position is the same position in the queue vacated by the discarded job.

In Example 10, the subject matter of Examples 1-8 may include wherein the position is a last position in the queue.

In Example 11, the subject matter of Examples 1-8 may include sorting the jobs in the queue according to their metric.

In Example 12, the subject matter of Example 11 may include wherein the jobs in the queue are sorted upon discarding the job with the minimum metric.

In Example 13, the subject matter of Example 12 may include allocating the last position in the queue to the job associated with the least one request metric.

In Example 14, the subject matter of Example 12 may include including the job associated with the at least one request metric in the sorting of the jobs.

In Example 15, the subject matter of Examples 11-14 may include wherein the sorting is done in ascending order so that the job with the highest metric is at a front of the queue.

In Example 16, the subject matter of Examples 1-15 may include wherein each job's metric is calculated according to a utility function comprising a plurality of parameters.

In Example 17, the subject matter of Example 16 may include wherein the utility function monotonically increases with larger differences between the estimate output and the previous output of the respective job.

In Example 18, the subject matter of Examples 16-17 may include wherein the utility function comprises an age change parameter.

In Example 19, the subject matter of Example 18 may include wherein the age change parameter comprises a difference in time since a last job update for the respective job.

In Example 20, the subject matter of Examples 18-19 may include wherein the age change parameter is normalized to a maximum age.

In Example 21, the subject matter of Examples 16-20 may include wherein the utility function comprises a channel correlation change parameter.

In Example 22, the subject matter of Example 21 may include wherein the channel correlation change parameter comprises a difference in channel correlation since a last job update for the respective job.

In Example 23, the subject matter of Examples 21-22 may include wherein the channel correlation change is normalized by a correlation change maximum.

In Example 24, the subject matter of Examples 16-23 may include wherein the utility function comprises a signal to noise ratio (SNR) change parameter.

In Example 25, the subject matter of Example 24 may include wherein the SNR change parameter comprises a difference in SNR since a last job update for the respective job.

In Example 26, the subject matter of Examples 24-25 may include wherein the SNR change parameter is normalized by a maximum SNR change.

In Example 27, the subject matter of Examples 16-26 may include wherein the utility function comprises a Doppler change parameter.

In Example 28, the subject matter of Example 27 may include wherein the Doppler change parameter comprises a difference in Doppler since a last job update for the respective job.

In Example 29, the subject matter of Examples 27-28 may include wherein the Doppler change parameter is normalized by a maximum Doppler change.

In Example 30, the subject matter of Examples 16-29 may include wherein the utility function comprises a precoding matrix indicator (PMI) parameter.

In Example 31, the subject matter of Examples 16-30 may include wherein the utility function comprises a channel state information (CSI) reference signal (RS) indicator parameter.

In Example 32, the subject matter of Examples 16-31 may include wherein each of the parameters are multiplied by a weighing factor.

In Example 33, the subject matter of Example 32 may include wherein each of the weighing factors are configured to determine a relative weight of the parameters in relation to each other.

In Example 34, the subject matter of Examples 32-33 may include wherein the weighing factors are fixed.

In Example 35, the subject matter of Examples 32-33 may include wherein the weighing factors are dynamic.

In Example 36, the subject matter of Example 35 may include tuning the dynamic weighing factors in response to changes in the plurality of parameters.

In Example 37, the subject matter of Examples 1-36 may include wherein at least one of the one or more requested jobs is requested by a radio access network (RAN).

In Example 38, the subject matter of Examples 1-37 may include wherein at least one of the jobs is a computation of a channel state information (CSI) report.

In Example 39, the subject matter of Examples 1-38 may include wherein the method is conducted at a physical layer processing circuit of a communication device.

In Example 40, a method for job scheduling at a signal processing component in response to one or more requests for new jobs, wherein the one or more new jobs exceed a number of available positions in a queue pending execution at the signal processing component, the method including calculating a metric for each of the one or more new jobs, wherein each metric of a respective job is based on a difference between an estimate output of executing the respective job in current conditions and a previous output of the respective job; sorting the one or more new jobs and jobs pending execution in the queue according to their metric; and re-assigning positions in the queue to jobs according to the sorted metrics.

In Example 41, the subject matter of Example 40 may include discarding jobs which have not been re-assigned position in the queue once the positions in the queue are filled.

In Example 42, the subject matter of Examples 40-41 may include calculating a metric for each of the jobs pending execution in the queue.

In Example 43, the subject matter of Examples 40-42 may include eliminating jobs which have begun execution at the signal processing component from the sorting.

In Example 44, the subject matter of Examples 40-43 may include wherein each job's metric is calculated according to a utility function comprising a plurality of parameters.

In Example 45, the subject matter of Example 44 may include wherein the utility function monotonically increases with larger differences between the estimate output and the previous output of the respective job.

In Example 46, the subject matter of Examples 44-45 may include wherein the utility function comprises an age change parameter.

In Example 47, the subject matter of Example 46 may include wherein the age change parameter comprises a difference in time since a last job update for the respective job.

In Example 48, the subject matter of Examples 47-48 may include wherein the age change parameter is normalized to a maximum age.

In Example 49, the subject matter of Examples 44-48 may include wherein the utility function comprises a channel correlation change parameter.

In Example 50, the subject matter of Example 49 may include wherein the channel correlation change parameter comprises a difference in channel correlation since a last job update for the respective job.

In Example 51, the subject matter of Examples 49-50 may include wherein the channel correlation change is normalized by a correlation change maximum.

In Example 52, the subject matter of Examples 44-51 may include wherein the utility function comprises a signal to noise ratio (SNR) change parameter.

In Example 53, the subject matter of Example 52 may include wherein the SNR change parameter comprises a difference in SNR since a last job update for the respective job.

In Example 54, the subject matter of Examples 52-53 may include wherein the SNR change parameter is normalized by a maximum SNR change.

In Example 55, the subject matter of Examples 44-54 may include wherein the utility function comprises a Doppler change parameter.

In Example 56, the subject matter of Example 55 may include wherein the Doppler change parameter comprises a difference in Doppler since a last job update for the respective job.

In Example 57, the subject matter of Examples 55-56 may include wherein the Doppler change parameter is normalized by a maximum Doppler change.

In Example 58, the subject matter of Examples 44-57 may include wherein the utility function comprises a precoding matrix indicator (PMI) parameter.

In Example 59, the subject matter of Examples 44-58 may include wherein the utility function comprises a channel state information (CSI) reference signal (RS) indicator parameter.

In Example 60, the subject matter of Examples 44-59 may include wherein each of the parameters are multiplied by a weighing factor.

In Example 61, the subject matter of Example 60 may include wherein each of the weighing factors are configured to determine a relative weight of the parameters in relation to each other.

In Example 62, the subject matter of Examples 60-61 may include wherein the weighing factors are fixed.

In Example 63, the subject matter of Examples 60-61 may include wherein the weighing factors are fixed.

In Example 64, the subject matter of Example 63 may include tuning the dynamic weighing factors in response to changes in the plurality of parameters.

In Example 65, the subject matter of Examples 40-64 may include wherein at least one of the one or more requested jobs is requested by a radio access network (RAN).

In Example 66, the subject matter of Examples 40-65 may include wherein at least one of the jobs is a computation of a channel state information (CSI) report.

In Example 67, the subject matter of Examples 40-66 may include wherein the method is conducted at a physical layer processing circuit of a communication device.

In Example 68, a circuitry configured to schedule execution of jobs at a signal processing component of a device in response to a request for a new job, the circuitry including: a computing circuit configured to compute a metric for each of a plurality of jobs in a queue waiting to be processed and a request metric for at least one of the one or more requested jobs, wherein each metric is based on a difference in expected output of executing a respective job in current conditions compared to the respective job's output from a previous execution; a determiner configured to determine a minimum metric from the metrics calculated for each of the plurality of jobs in the queue; and a comparison circuit configured to compare the minimum metric to at least one request metric.

In Example 69, the subject matter of Example 68 may include wherein where the request metric is greater than the minimum metric, the comparison circuit further configured to reallocate a position in the queue to the job associated with the request metric and discard the job associated with the minimum metric.

In Example 70, the subject matter of Examples 68-69 may include wherein where the minimum metric is greater than or equal to the request metric, the comparison circuit further configured to discard the new job.

In Example 71, the subject matter of Examples 68-70 may include the determiner further configured to determine the minimum metric from jobs in the queue which have not commenced execution.

In Example 72, the subject matter of Examples 68-71 may include the comparison circuit further configured to evaluate whether execution of the job associated with the minimum metric has commenced prior to reallocating the position in the queue to the job with the greater request metric.

In Example 73, the subject matter of Example 72 may include wherein where execution of the job associated with the minimum metric has commenced, the circuitry further configured to determine a next minimum metric from the calculated metrics for the remaining jobs in the queue and compare the next minimum metric to at least one of the request metrics.

In Example 74, the subject matter of Example 73 may include where the next minimum metric is greater than or equal to the request metric, the circuitry configured to discard the job associated with the request metric.

In Example 75, the subject matter of Examples 68-74 may include a sorting circuit configured to sort the jobs in the queue according to their metric.

In Example 76, the subject matter of Example 75 may include wherein the jobs are sorted upon discarding the job with the minimum metric.

In Example 77, the subject matter of Examples 68-76 may include allocating a position in the queue to the job associated with the least one request metric.

In Example 78, the subject matter of Examples 68-76 may include including the job associated with the at least one request metric in the sorting of the jobs.

In Example 79, the subject matter of Examples 68-78 may include wherein the sorting is done in ascending order so that the job with the highest metric is at a front of the queue.

In Example 80, the subject matter of Examples 68-79 may include the computing circuit configured to calculate each metric according to a utility function comprising a plurality of parameters.

In Example 81, the subject matter of Example 80 may include wherein the utility function monotonically increases with larger differences between the estimate output and the previous output of the respective job.

In Example 82, the subject matter of Examples 80-81 may include wherein the utility function comprises an age change parameter.

In Example 83, the subject matter of Example 82 may include wherein the age change parameter comprises a difference in time since a last job update for the respective job.

In Example 84, the subject matter of Examples 82-83 may include wherein the age change parameter is normalized to a maximum age.

In Example 85, the subject matter of Examples 80-84 may include wherein the utility function comprises a channel correlation change parameter.

In Example 86, the subject matter of Example 85 may include wherein the channel correlation change parameter comprises a difference in channel correlation since a last job update for the respective job.

In Example 87, the subject matter of Examples 85-86 may include wherein the channel correlation change is normalized by a correlation change maximum.

In Example 88, the subject matter of Examples 80-87 may include wherein the utility function comprises a signal to noise ratio (SNR) change parameter.

In Example 89, the subject matter of Example 88 may include wherein the SNR change parameter comprises a difference in SNR since a last job update for the respective job.

In Example 90, the subject matter of Examples 88-89 may include wherein the SNR change parameter is normalized by a maximum SNR change.

In Example 91, the subject matter of Examples 80-90 may include wherein the utility function comprises a Doppler change parameter.

In Example 92, the subject matter of Example 91 may include wherein the Doppler change parameter comprises a difference in Doppler since a last job update for the respective job.

In Example 93, the subject matter of Examples 91-92 may include wherein the Doppler change parameter is normalized by a maximum Doppler change.

In Example 94, the subject matter of Examples 80-93 may include wherein the utility function comprises a precoding matrix indicator (PMI) parameter.

In Example 95, the subject matter of Examples 80-94 may include wherein the utility function comprises a channel state information (CSI) reference signal (RS) indicator parameter.

In Example 96, the subject matter of Examples 80-95 may include wherein each of the parameters are multiplied by a weighing factor.

In Example 97, the subject matter of Example 96 may include wherein each of the weighing factors are configured to determine a relative weight of the parameters in relation to each other.

In Example 98, the subject matter of Examples 96-97 may include wherein the weighing factors are fixed.

In Example 99, the subject matter of Examples 96-97 may include wherein the weighing factors are dynamic.

In Example 100, the subject matter of Example 99 may include tuning the dynamic weighing factors in response to changes in the plurality of parameters.

In Example 101, the subject matter of Examples 68-100 may include wherein at least one of the one or more requested jobs is requested by a radio access network (RAN).

In Example 102, the subject matter of Examples 68-101 may include wherein at least one of the jobs is a computation of a channel state information (CSI) report.

In Example 103, a circuit configured to schedule job execution at a signal processing component in response to one or more requests for new jobs, where the one or more new jobs exceeds a number of available positions in a queue pending execution at the signal processing component, the circuit including: a determiner configure to determine a metric for each of the one or more new jobs, wherein each metric of a respective job is based on a difference between an estimate output of executing the respective job in current conditions and a previous output of the respective job; a sorter configured to sort the one or more new jobs and jobs pending execution in the queue according to their metric; and an assignor configured to re-assign positions in the queue to the one or more new jobs and the jobs in the queue according to their metric.

In Example 104, the subject matter of Example 103 may include the assignor further configured to discard jobs which have not been re-assigned a position in the queue once the positions in the queue have been filled.

In Example 105, the subject matter of Examples 103-104 may include the determiner further configured to determine a metric for each of the jobs pending execution in the queue.

In Example 106, the subject matter of Examples 103-105 may include the sorter further configured to eliminate jobs which have begun execution at the signal processing component from the sorting.

In Example 107, the subject matter of Examples 103-106 may include the determiner further configured to determine each job's metric according to a utility function comprising a plurality of parameters.

In Example 108, the subject matter of Example 107 may include wherein the utility function monotonically increases with larger differences between the estimate output and the previous output of the respective job.

In Example 109, the subject matter of Examples 107-108 may include wherein the utility function comprises an age change parameter.

In Example 110, the subject matter of Example 109 may include wherein the age change parameter comprises a difference in time since a last job update for the respective job.

In Example 111, the subject matter of Examples 109-110 may include wherein the age change parameter is normalized to a maximum age.

In Example 112, the subject matter of Examples 107-111 may include wherein the utility function comprises a channel correlation change parameter.

In Example 113, the subject matter of Example 112 may include wherein the channel correlation change parameter comprises a difference in channel correlation since a last job update for the respective job.

In Example 114, the subject matter of Examples 112-113 may include wherein the channel correlation change is normalized by a correlation change maximum.

In Example 115, the subject matter of Examples 107-114 may include wherein the utility function comprises a signal to noise ratio (SNR) change parameter.

In Example 116, the subject matter of Example 115 may include wherein the SNR change parameter comprises a difference in SNR since a last job update for the respective job.

In Example 117, the subject matter of Examples 115-116 may include wherein the SNR change parameter is normalized by a maximum SNR change.

In Example 118, the subject matter of Examples 107-117 may include wherein the utility function comprises a Doppler change parameter.

In Example 119, the subject matter of Example 118 may include wherein the Doppler change parameter comprises a difference in Doppler since a last job update for the respective job.

In Example 120, the subject matter of Examples 118-119 may include wherein the Doppler change parameter is normalized by a maximum Doppler change.

In Example 121, the subject matter of Examples 107-120 may include wherein the utility function comprises a precoding matrix indicator (PMI) parameter.

In Example 122, the subject matter of Examples 107-121 may include wherein the utility function comprises a channel state information (CSI) reference signal (RS) indicator parameter.

In Example 123, the subject matter of Examples 107-122 may include wherein each of the parameters are multiplied by a weighing factor.

In Example 124, the subject matter of Example 123 may include wherein each of the weighing factors are configured to determine a relative weight of the parameters in relation to each other.

In Example 125, the subject matter of Examples 123-124 may include wherein the weighing factors are fixed.

In Example 126, the subject matter of Examples 123-124 may include wherein the weighing factors are dynamic.

In Example 127, the subject matter of Example 126 may include tuning the dynamic weighing factors in response to changes in the plurality of parameters.

In Example 128, the subject matter of Examples 103-127 may include wherein at least one of the one or more requested jobs is requested by a radio access network (RAN).

In Example 129, the subject matter of Examples 103-128 may include wherein at least one of the jobs is a computation of a channel state information (CSI) report.

A non-transitory computer readable medium with program instructions which when executed cause a processor of a device to cause the device to execute the method of any one of claims 1-67 or realize a device of any one of claims 68-129.

While the above descriptions and connected figures may depict electronic device components as separate elements, skilled persons will appreciate the various possibilities to combine or integrate discrete elements into a single element. Such may include combining two or more circuits to form a single circuit, mounting two or more circuits onto a common chip or chassis to form an integrated element, executing discrete software components on a common processor core, etc. In addition, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuitry configured to schedule execution of jobs at a signal processing component of a device in response to a request for a new job, the circuitry comprising a processor configured to:

compute a metric for each of a plurality of jobs in a queue waiting to be processed and a request metric for the new job, wherein each respective metric, including the request metric for the new job and a metric for each of the plurality of jobs in the queue, is based on a difference in expected output of executing a respective job in current wireless communication channel conditions compared to the respective job's output from a previous execution, wherein each respective metric is calculated according to a utility function comprising a plurality of parameters, wherein the utility function computes a weighted value for the difference for each respective job based on current and historical wireless communication channel parameters, wherein the utility function monotonically increases with larger differences between the expected output of executing the respective job in current wireless communication channel conditions and the respective job's output from the previous execution;

determine a minimum metric from the metrics calculated for the plurality of jobs in the queue, wherein the minimum metric comprises a lowest metric of the respective metrics calculated for the plurality of jobs in the queue;

compare the minimum metric to the request metric;

based on the request metric being greater than the minimum metric, reallocate a position in the queue to the new job associated with the request metric and discard the job of the plurality of jobs in the queue associated with the minimum metric, or based on the request metric being less than or equal to the minimum metric, discard the new job; and execute one or more of the plurality of jobs in the queue according to each of the respective job's associated position in the queue.

2. The circuitry of claim 1, the processor further configured to determine the minimum metric from jobs in the queue which have not commenced execution.

3. The circuitry of claim 1, the processor further configured to sort the jobs in the queue according to their metric.

4. The circuitry of claim 1, wherein the current and historical wireless communication channel parameters comprise a channel correlation change parameter.

5. The circuitry of claim 1, wherein the current and historical wireless communication channel parameters comprise a signal to noise ratio (SNR) change parameter.

6. The circuitry of claim 1, wherein the current and historical wireless communication channel parameters comprise a Doppler change parameter.

7. The communication device of claim 1, the current and historical wireless communication channel parameters plurality of parameters comprising an age change parameter.

8. The communication device of claim 7, wherein the age change parameter is based on when the respective job was issued.

9. The communication device of claim 1, wherein the utility function monotonically increases with larger differences between the expected output of executing the respective job in current wireless communication channel conditions and the respective job's output from the previous execution, and wherein the current and historical wireless communication channel parameters comprise one or more of:
an age of the respective job normalized with a maximum age;
a difference in channel correlation since the previous execution of the respective job normalized with a maximum channel correlation change;
a difference in signal to noise (SNR) ratio since the previous execution of the respective job normalized with a maximum SNR change; and/or
a difference in Doppler since the previous execution of the respective job normalized with a maximum Doppler change.

10. The communication device of claim 9, wherein the current and historical wireless communication channel parameters comprise one or more of:
a precoding matrix indicator; and/or
a channel state information signal reference signal indicator.

11. A method for job scheduling at a signal processing component having a full queue of jobs pending execution, in response to a request for a new job, the method comprising:
calculating a metric for each job in the queue and a request metric for the new job, wherein each respective job's metric is based on a difference between an estimate output of executing the respective job in current conditions and a previous output of the respective job, wherein each respective job's metric is calculated according to a utility function which computes a weighted value that indicates the difference between the estimate output and the previous output for each respective job based on current and historical wireless communication channel parameters, wherein the current and historical wireless communication channel parameters comprise a channel correlation change parameter, and wherein the utility function monotonically increases with larger differences between the estimate output and the previous output;
determining a minimum metric from the metrics calculated for the jobs in the queue, wherein the minimum metric comprises a lowest metric of the respective metrics calculated for the plurality of jobs in the queue;
comparing the minimum metric to the request metric;
discarding the job associated with the minimum metric and reallocating a position in the queue to the new job based on the request metric being greater than the minimum metric, or, discarding the new job based on the request metric being less than or equal to the minimum metric; and
executing one or more of the plurality of jobs in the queue according to each of the respective job's associated position in the queue.

12. The method of claim 11, wherein the current and historical wireless communication channel parameters comprise an age change parameter.

13. The method of claim 11, wherein the current and historical wireless communication channel parameters comprise a signal to noise ratio (SNR) change parameter.

14. The method of claim 11, wherein the current and historical wireless communication channel parameters comprise a Doppler change parameter.

15. A non-transitory computer readable medium with program instructions which when executed cause a processor of a device to cause the device to perform a job scheduling at a signal processing component having a full queue of jobs pending execution, comprising:
calculating a metric for each job in the queue and a request metric for the new job, wherein each respective job's metric is based on a difference between an estimate output of executing the respective job in current wireless communication channel conditions and a previous output of the respective job, wherein each respective job's metric is calculated according to a utility function which computes a weighted value that indicated the difference between the estimate output and the previous output for each respective job based on current and historical wireless communication channel parameters, wherein the utility function monotonically varies based on differences between the estimate output and the previous output;
determining a minimum metric from the metrics calculated for the jobs in the queue, wherein the minimum metric comprises a lowest metric of the respective metrics calculated for the plurality of jobs in the queue;
comparing the minimum metric to the request metric;
discarding the job associated with the minimum metric and reallocating a position in the queue to the new job based on the request metric being greater than the minimum metric, or, discarding the new job based on the request metric being less than or equal to the minimum metric; and
executing one or more of the plurality of jobs in the queue according to each of the respective job's associated position in the queue.

* * * * *